March 25, 1941. E. E. SHERWOOD 2,235,905
FISH BAIT
Filed June 7, 1937
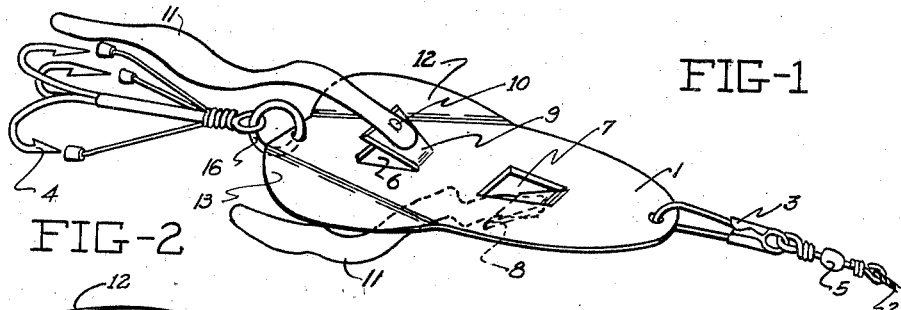
FIG-1
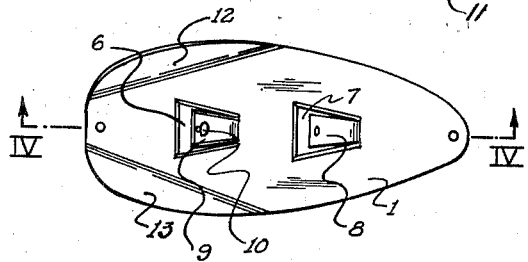
FIG-2
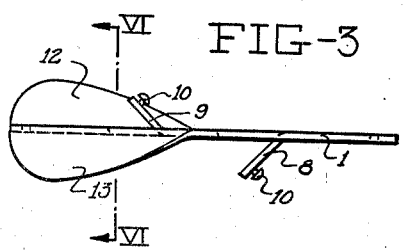
FIG-3
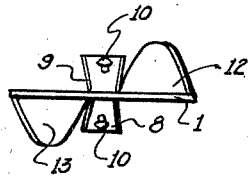
FIG-5
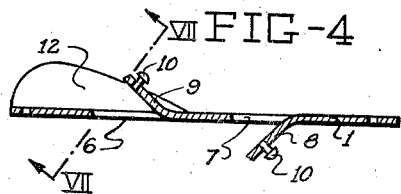
FIG-4
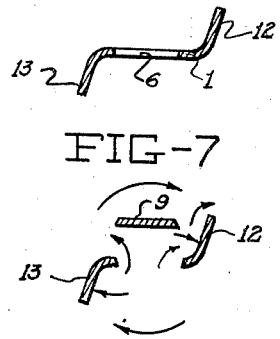
FIG-6
FIG-7
*Eben E. Sherwood*
INVENTOR.
BY *Frank H. Marks*
ATTORNEY.

Patented Mar. 25, 1941

2,235,905

UNITED STATES PATENT OFFICE 2,235,905

FISH BAIT

Eben E. Sherwood, Evanston, Ill.

Application June 7, 1937, Serial No. 146,873

7 Claims. (Cl. 43—45)

This invention relates to artificial bait used in fishing and more particularly to that type of artificial bait which has a spinning movement imparted to it when it is drawn through the water in casting or trolling.

One object of the present invention is to provide an improved lure or spinner whose body can be made from a single piece of thin sheet metal.

Another object of this invention is to provide an artificial bait which is capable of rapid rotation about its axis of travel to increase its attraction to fish.

A further object of the instant invention is the provision of a lure which creates increased eddying or turbulence in its wake as it depicts a helical path when drawn through the water.

A still further object subserved by the invention is to provide a lure having a plurality of light-reflecting faces capable of intermittently reflecting light in various directions so as to give a flashing effect as the lure is drawn through the water.

Another object is to provide a lure of the type referred to which will have enhanced light reflecting properties due to provision of elements which serve as reflectors, churning members, and also as elements for attachment of accessory luring members, such as strips of pork rind.

Other objects and advantages of this invention will become apparent after study of the ensuing description and the accompanying drawing, in which:

Fig. 1 depicts in perspective a lure embodying the principles of my invention.

Fig. 2 is a plan view of the lure.

Fig. 3 is a side edge view of the body of the lure.

Fig. 4 shows the body of the lure taken in section through the line IV—IV of Fig. 2.

Fig. 5 is a front edge view of the body of the lure.

Fig. 6 depicts the body of the lure taken in section through the line VI—VI of Fig. 3.

Fig. 7 illustrates the body of the lure taken in section on the line VII—VII of Fig. 4.

It will be seen that the lure body 1 is fastened to the trolling line 2 by any suitable means, as the snap fastener 3, and may detachably support hooks 4. The body 1 is free to rotate about its median or longitudinal axis due to its securement to the line 2 by the swivel-connection 5. The body has two slots 6 and 7 which may be bisected by the longitudinal axis of the body. The material bounded by three sides of each slot is bent away from the longitudinal axis of the body to form deflectors 8 and 9. It will be noted that the trailing edges of the deflectors 8 and 9 are rearward in relation to the direction of travel of the lure. It will be seen that the deflectors 8 and 9 are oppositely bent. Each deflector supports a headed pin 10 to which may be fastened a strip of pork rind 11 or other flexible light reflecting material for enhancing the attractiveness of the lure.

The body of the lure is oppositely bent to form two fins 12 and 13. These fins impart effective rotation to the lure body about its longitudinal axis when the lure is drawn through the water due to the water's flowing against the fins 12 and 13, producing components of force normal to the planes of said fins.

As may be seen the body is substantially elliptical in profile and symmetrical about its longitudinal axis.

The relation of the deflectors 8 and 9 to one another is clearly shown in Fig. 3. Movement of the lure through water produces a pressure on the forward faces of these deflectors, giving a wobbling or aqua-planing effect, i. e., an oscillation about a transverse axis, to the lure. This motion imparted to the lure closely imitates the darting movement of a small fish.

The relation of the fins 12 and 13 to one another and to the body 1 is illustrated by Figs. 5 and 6. As stated, these fins, bent at an angle to the lure body 1, cause effective rotation of the body about its median or longitudinal axis.

Fig. 7 shows the direction of rotation of the lure body about its axis. It also illustrates the turbulence given to the flow of water by the presence of the opening 6 and its coacting deflector 9.

This turbulence, especially when the lure is drawn through the water at or near the surface, produces a foaming action on the water which attracts the attention of the fish, and this effect is greatly enhanced by the attachment of strips of pork rind or the like to the fastening members 10. It will be understood that, as is usual in baits of this general type, the position of the bait relative to the surface may be varied according to its speed through the water, since the greater the speed the closer the bait will be to the surface.

It will be found that an effective spinning movement about the lure's longitudinal axis will be imparted even when the lure is drawn through the water very slowly. The metal from which the lure is made can be of thin section so that it may be easily stamped out and fabricated. The lure may have a highly polished surface such as a chrome or nickel plated finish to effectively reflect light from its plane surfaces as it rotates about its axis, it being understood that a bright glittering object will attract fish from a considerable distance.

I am aware that many changes may be made and details of construction varied through a wide range without departing from the principles of my invention, and I therefore do not purpose limiting the patent granted hereon otherwise than as necessitated by the prior art.

I claim:

1. A fish lure plate having spinner fins and vanes projecting laterally from said plate and transverse to said pins, said vanes being spaced axially along the plate, and means on said vanes and spaced from said plate for anchoring strips of pork rind or the like.

2. A fish lure comprising a plate having means for imparting a spinning movement to the lure as the lure is drawn through the water, and vanes struck up from opposite sides of said plate, providing surfaces transverse to the direction in which the lure is drawn, one of said surfaces being disposed in advance of the other.

3. A fish lure comprising a plate having means for imparting a spinning movement to the lure as the lure is drawn through the water, and vanes struck up from opposite sides of said plate, providing surfaces transverse to the direction in which the lure is drawn, one of said surfaces being disposed in advance of the other, said lure being provided with means for the attachment of a flexible streamer.

4. As an article of manufacture, a fish lure comprising a plate having means for imparting a spinning movement to the lure as the lure is drawn through the water, and vanes struck up from opposite sides of said plate, providing surfaces transverse to the direction in which the lure is drawn, one of said surfaces being spaced from said fins in said direction.

5. A fish lure comprising a plate having means for imparting a spinning movement to the lure as the lure is drawn through the water, and vanes struck up from opposite sides of said plate, providing surfaces transverse to the direction in which the lure is drawn and to said vanes.

6. A fish lure comprising a plate having means for imparting a spinning movement to the lure as the lure is drawn through the water, and vanes struck up from opposite sides of said plate, providing surfaces transverse to the direction in which the lure is drawn, the ends of the intersection of each surface with the plate lying in a line substantially normal to said direction.

7. A fish lure comprising a member having means integral therewith for imparting aquaplaning movement to the lure as it is drawn through the water, and means integral with said member for imparting a rotary movement to the lure.

EBEN E. SHERWOOD.

CERTIFICATE OF CORRECTION.

Patent No. 2,235,905. March 25, 1941.

EBEN E. SHERWOOD.

It is hereby certified that error appears in the printed specification of the above numbered patent requiring correction as follows: Page 2, first column, line 17, claim 1, for the word "pins" read --fins--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.